UNITED STATES PATENT OFFICE.

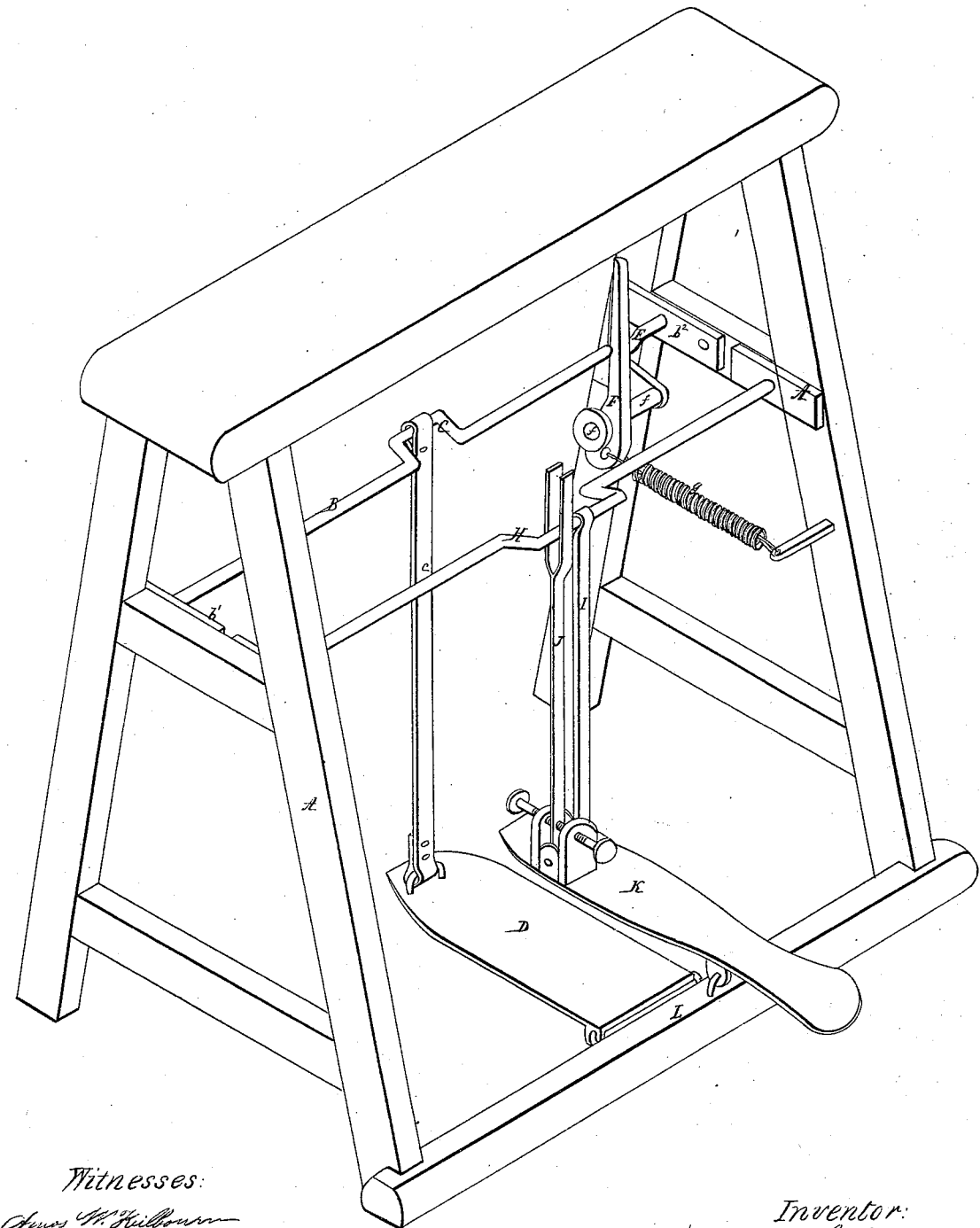

FREDERICK S. STODDARD, OF LITCHFIELD, CONNECTICUT.

IMPROVEMENT IN FOOT-POWER MACHINES.

Specification forming part of Letters Patent No. 24,064, dated May 17, 1859.

*To all whom it may concern:*

Be it known that I, FREDERICK S. STODDARD, of the town and county of Litchfield, in the State of Connecticut, have invented new and useful improvements in cranks and the mode of operating them for foot-power machinery; and I do hereby declare that the following is a clear and exact description, referring to the drawings making part of this specification.

The nature of my invention consists in two modes—

First, of a two-throw crank on one shaft, to which is attached only one pitman to connect with the foot-piece or treadle. The other crank, being nearly at a right angle, has a lever made to bear against it by the action of a weak spring, which will always hold the pitman-crank in the position for starting and rotating the shaft in one given direction.

Second, a single crank having an adjustable spring bearing upon it, which is attached to the foot-piece.

In order to enable others skilled in the art to make and use my invention, I will describe both modes, referring to the drawings and the letters thereon.

Figure 1 represents in perspective the brackets or frame A A to support a lathe or table. The crank-shaft B is hung on journals $b'$ $b^2$ at the ends. C is the center crank, to which the pitman $c$ is attached to connect it with the foot-piece D. The crank E, upon the same shaft, is at a right angle to the crank C, and is pressed upon its bearing by a lever, F, which works upon a pivot, $f$, and is held to its position by the spring $g$. Another mode is shown in the single crank-shaft H, which has the pitman I and the spring J, both operating on the same throw of the crank and running parallel with each other, both connecting with the foot-piece K at the back end, which is nearly balanced on the bar L. The set-screws $l\ l$, back and front, are to adjust the pressure on the spring J, so as to cause the shaft to rotate in either direction, as may be required.

It is of great importance in foot-power machinery that the crank should remain in a position to always start in the right direction. This I have effectually accomplished without the aid of a counter-balance.

Having thus described my improvements in foot-power machinery, what I claim as new, and desire to secure by Letters Patent, is—

1. A two-throw crank operated by one pitman, in combination with a lever and spring or their equivalents, as described.

2. The mode of attaching the spring to the foot-piece to operate on the pitman-crank, in connection with the set-screws for adjusting and reversing the motion, as set forth.

FREDERICK S. STODDARD.

Witnesses:
AMOS W. KILBOURN,
GEO. C. WOODRUFF.